United States Patent
Stefani (10) Patent No.: US 12,134,373 B2
(45) Date of Patent: Nov. 5, 2024

(54) WIPING DEVICE FOR A DETECTION SYSTEM

(71) Applicant: VALEO SYSTEMES D'ESSUYAGE, La Verriere (FR)

(72) Inventor: Siegfried Stefani, La Verriere (FR)

(73) Assignee: VALEO SYSTEMES D'ESSUYAGE, La Verriere (FR)

( * ) Notice: Subject to any disclaimer, the term of this patent is extended or adjusted under 35 U.S.C. 154(b) by 0 days.

(21) Appl. No.: 17/797,574

(22) PCT Filed: Jan. 11, 2021

(86) PCT No.: PCT/EP2021/050413
§ 371 (c)(1),
(2) Date: Aug. 4, 2022

(87) PCT Pub. No.: WO2021/156019
PCT Pub. Date: Aug. 12, 2021

(65) Prior Publication Data
US 2023/0057122 A1 Feb. 23, 2023

(30) Foreign Application Priority Data
Feb. 7, 2020 (EP) .................................... 20156068

(51) Int. Cl.
*B60S 1/56* (2006.01)
*B60S 1/20* (2006.01)
(Continued)

(52) U.S. Cl.
CPC ................. *B60S 1/566* (2013.01); *B60S 1/20* (2013.01); *B60S 1/3404* (2013.01);
(Continued)

(58) Field of Classification Search
CPC ........... B60S 1/566; B60S 1/20; B60S 1/3404
(Continued)

(56) References Cited

U.S. PATENT DOCUMENTS

| | | | | | |
|---|---|---|---|---|---|
| 1,555,341 A | * | 9/1925 | Waters | ...................... | B60S 1/30 15/250.24 |
| 1,643,919 A | * | 9/1927 | Bornstein | ................. | B60S 1/18 74/37 |
| 1,720,832 A | * | 7/1929 | Baldwin | ............... | B60S 1/3404 15/250.24 |

(Continued)

FOREIGN PATENT DOCUMENTS

| CN | 108196480 A | 6/2018 |
|---|---|---|
| EP | 0869667 A2 | 10/1998 |

(Continued)

OTHER PUBLICATIONS

European Patent Office, International Search Report and Written Opinion of corresponding International Application No. PCT/EP2021/050413, dated Mar. 16, 2021.

(Continued)

*Primary Examiner* — Gary K. Graham
(74) *Attorney, Agent, or Firm* — VALEO SYSTEMS D'ESSUYAGE (57) ABSTRACT

The present invention relates to a wiping device for a detection system of a vehicle, including a wiper blade, a wiper arm, a motor unit and a drive unit. The drive unit includes a guidance block which carries the wiper arm, and which is inserted in a guidance frame, and a plurality of belt wheels. At least one drive belt wheel is driven in a rotational motion by the motor unit. The drive unit further includes a belt which is driven by the belt wheels and moves the guidance block according to a rectilinear motion.

13 Claims, 6 Drawing Sheets

(51) Int. Cl.
  *B60S 1/34*   (2006.01)
  *G01S 7/481*  (2006.01)
  *G01S 17/931* (2020.01)
  *G02B 27/00*  (2006.01)

(52) U.S. Cl.
  CPC .......... *G01S 7/4813* (2013.01); *G01S 17/931* (2020.01); *G02B 27/0006* (2013.01)

(58) Field of Classification Search
  USPC .......................................... 15/250.29, 250.24
  See application file for complete search history.

(56) References Cited

U.S. PATENT DOCUMENTS

| | | | | |
|---|---|---|---|---|
| 3,378,875 A | * | 4/1968 | Kern .......................... | A47L 1/02 |
| | | | | 15/250.04 |
| 3,399,418 A | * | 9/1968 | Wynn ................... | B60S 1/3404 |
| | | | | 15/250.24 |
| 3,667,082 A | * | 6/1972 | Hoyler .................... | B60S 1/603 |
| | | | | 15/250.19 |
| 5,005,248 A | | 4/1991 | Bonar | |
| 5,713,098 A | * | 2/1998 | Mayer ....................... | F16H 1/22 |
| | | | | 254/389 |
| 2017/0369039 A1 | * | 12/2017 | Rousseau .............. | B60S 1/3404 |

FOREIGN PATENT DOCUMENTS

| | | |
|---|---|---|
| EP | 3838691 A1 | 6/2021 |
| JP | S48008188 B | 3/1973 |
| JP | S59102559 U | 7/1984 |
| JP | H02125446 U | 10/1990 |
| JP | H05180295 A | 7/1993 |
| JP | H10-61730 A | 3/1998 |
| JP | H11142514 A | 5/1999 |
| JP | 2013-122294 A | 6/2013 |
| WO | 2020001593 A1 | 1/2020 |

OTHER PUBLICATIONS

European Patent Office, Communication Pursuant to Article 94(3) EPC, of corresponding European Application No. 20156068.7, dated Oct. 28, 2022.

Japan Patent Office, Office Action (including English translation) of corresponding Japanese Patent Application No. 2022-548080, dated Oct. 20, 2023.

Korean Patent Office, Office Action (including English translation) of corresponding Korean patent application No. 10 2022 7030977, dated Feb. 19, 2024.

* cited by examiner

WIPING DEVICE FOR A DETECTION SYSTEM

CROSS-REFERENCE TO RELATED APPLICATIONS

This application is filed under 35 U.S.C. § 371 U.S. National Phase of International Application No. PCT/EP2021/050413 filed Jan. 11, 2021 (published as WO2021156019), which claims priority benefit to European Application No. 20156068.7 filed on Feb. 7, 2020, the disclosures of which are herein incorporated by reference in their entirety.

TECHNICAL FIELD

The present invention concerns the domain of wiping devices for a vehicle. More particularly, the invention relates to a wiping device for a detection system of a vehicle.

BACKGROUND OF THE INVENTION

More and more vehicles are nowadays implemented with detection systems, for example a parking aid or a lidar system, which are present in many recent vehicles. That's why the question about how to clean these detection systems has been quickly asked.

It is known to use some wiping devices equipped with a wiper blade and a wiper arm. The wiper blade, carried by the wiper arm and driven by a motor, wipes the detection system, either an optical surface or a window arranged in front of the detection system. Thus, in case of rainy weather or a cleaning need, the wiping device permits a clear view for the detection system.

The motor sets in motion the wiper arm and the wiper blade. This type of motor generates usually a rotational motion, and the wiping device has to convert the rotational motion of the motor into a rectilinear motion. Thus, the wiper blade moves in a back and forth movement against a surface which needs to be cleaned. This movement conversion needs to be done in a smoothly way and without any mechanical interferences.

BRIEF SUMMARY OF THE INVENTION

The present invention allows to optimize this movement conversion by providing a wiping device for a detection system of a vehicle, comprising a wiper blade, a wiper arm, a motor unit and a drive unit, such drive unit comprising a guidance block which carries the wiper arm, and which is inserted in a guidance frame, such drive unit comprising a plurality of belt wheels, at least one drive belt wheel is driven in a rotational motion by the motor unit, characterized in that the drive unit comprises a belt which is driven by the belt wheels and moves the guidance block according to a rectilinear motion.

The wiper arm and the wiper blade are configured to be set in a rectilinear motion. The wiper blade is disposed against a surface which needs to be cleaned, and the rectilinear motion permits to wipe this surface according to a back and forth movement. The drive unit is an intermediate part between the motor unit and the wiper arm, and has the function to convert a rotational motion initiated by the motor unit to a rectilinear motion of the wiper arm without mechanical interferences.

The guidance block sets the wiper arm and the wiper blade in a rectilinear motion and is consequently set in a rectilinear motion too. In order to maintain the guidance block in its rectilinear trajectory, the guidance frame has the function to guide the guidance block. The guidance frame is principally extended according to a direction parallel to the surface which needs to be cleaned and the guidance block is moving all along the guidance frame.

The motor unit sets the drive belt wheel in a rotational motion. This rotational motion is reversible, meaning that the motor unit rotates between a clockwise motion and a counterclockwise motion and transmits such motion to the drive belt wheel. Such reversible rotational motion can be an electrically reversible motion of a mechanically reversible motion. This reversible rotational motion leads to a reversible rectilinear motion of the guidance block, which allows the back and forth motion of the wiping blade against the surface to clean.

The belt is comprised in the drive unit with the belt wheels and the guidance block. More particularly, the belt carries the guidance block and is set in motion by at least the drive belt wheel. Thanks to the belt, the rotational motion of the drive belt wheel is converted to the rectilinear motion of the guidance block. The belt is arranged into the drive unit in order to proceed to such conversion, which runs without any mechanical interferences.

According to an aspect of the invention, the wiping device comprises two driven belt wheels which are arranged on each endpoint of the guidance frame. Contrary to the drive belt wheel which is set in motion directly by the motor unit, the driven belt wheels are set in motion by the belt. Each driven belt wheels have the same dimension and are arranged on each endpoints of the guidance frame. In other words, a part of the belt which is between each driven belt wheels is extended in a rectilinear direction, and the guidance block is attached to this part of the belt and moves from a driven belt wheel to the other. Thus, the layout of the driven belt wheels participates to the conversion of the rotational motion to the rectilinear motion.

According to an aspect of the invention, at least one driven belt wheel is carried by a belt wheel support arranged on the guidance frame. The belt wheel support can be molded in the guidance frame for example. The belt wheel support can consist in two strips comprising a hole, and separated by a distance which allows the establishment of the driven belt wheel between the two strips of the belt wheel support. The driven belt wheel comprising a drilling in its center, a rod can be arranged crossing each hole of the two strips and the drilling of the driven wheel. The rod is attached by gluing for example. The driven belt wheel is able to turn freely around the rod, and any other moves of the driven belt wheel are blocked by the belt wheel support.

According to an aspect of the invention, the belt is a toothed belt, the drive belt wheel and the driven belt wheels being toothed belt wheels to interact with the belt. Toothed belt and toothed belt wheels enable to avoid any parasitic sliding moves of the belt against any belt wheels. The teeth of the belt wheels and the teeth of the belt interact with each other by interlocking connection.

According to an aspect of the invention, the guidance frame comprises a guidance slot where the guidance block is inserted in a sliding manner. The guidance slot is extended all along the guidance frame and is configured to receive the guidance block. The guidance slot frames the guidance block. Thus, the only movement that can do the guidance block is the rectilinear motion set by the belt. Any other movements are blocked by the guidance slot. In order to insert the guidance block into the guidance slot, the latter can comprise a removable cap in an endpoint. The cap is removed to insert the guidance block in a sliding manner into the guidance slot, and is repositioned to close the guidance slot.

According to an aspect of the invention, the guidance block comprises a first attachment for the wiper arm, and a second attachment for the belt. As mentioned above, the guidance block carries the wiper arm, and is set in motion by the belt. So that the guidance block is simultaneously linked to the wiper arm and to the belt, the guidance block comprises two attachments, each attachment being adapted to link the wiper arm and the belt without mechanical interferences.

According to an aspect of the invention, the first attachment of the guidance block is passing through an opening of the guidance frame. The first attachment of the guidance block allows to link the wiper arm to the guidance block. Therefore, the guidance comprises an opening, which is mainly extended in a direction parallel to the rectilinear motion of the guidance block. The guidance block, more particularly the first attachment, emerges partially from the opening, which allows to link the wiper arm. Thus, even if the guidance block is inserted in the guidance slot, the opening allows the guidance block to carry the wiper arm, in order to wipe the surface to clean thanks to the wiper blade.

According to an aspect of the invention, the second attachment comprises a cavity where the belt is inserted in, and a fixing cover that comprises complementary forms with the belt. The second attachment of the guidance block allows to link the belt to the guidance block. The cavity is molded on the guidance block and is configured to receive the belt. A depth of the cavity corresponds to a thickness of the belt in order to limit any movements of the belt inside the cavity. When the belt is inserted into the cavity, the fixing cover encloses the cavity to lock the belt into the guidance block. The fixing cover can be attached to the guidance block, by screwing or clipping for example. The fixing cover is directly in contact with the belt and comprises complementary forms in a face which is oriented to the belt. The complementary forms of the fixing cover interlock with the teeth of the belt. Thus, when the belt is set in motion, the guidance block follows the motion of the belt thanks to the second attachment of the guidance block.

According to an aspect of the invention, the motor unit comprises a motor and a gearbox, the motor comprising a motor shaft which moves according to a unidirectional rotational motion, the gearbox being driven by the motor shaft and driving the drive belt wheel according to a reversible rotational motion. When the motor is operating, the shaft turns either clockwise or counterclockwise. The motor shaft can be a worm screw which is interlocked with the gearbox. The gearbox is driven by the motor shaft and converts the unidirectional rotational motion of the motor shaft to a reversible rotational motion. Such reversible rotational motion is transmitted to the drive belt wheel.

According to an aspect of the invention, a motor axis of rotation is perpendicular to a drive belt wheel axis of rotation.

The invention also comprises a detection system for a vehicle, comprising a sensor and a wiping device according to the invention. The sensor can be for example a parking aid or a LIDAR (acronym of "LIght Detection And Ranging" or "Laser Dectection And Ranging) device. Such sensor needs to have a clear field of view in order to work efficiently. The wiping device permits to maintain the efficiency of the sensor.

According to an aspect of the invention, the detection system comprises a windscreen configured to be placed in front of the sensor of the detection system. In other words, the windscreen is placed in the field of view of the sensor. The windscreen can have a plurality of functions, like shock protection for example, or, in this case, it's the windscreen which is cleaned by the wiper device and allows a clear field of view to the sensor.

According to an aspect of the invention, the windscreen comprises a cleaning area which is wiped by the wiper blade, a length of the cleaning area depends on a diameter of the drive belt wheel and a rotation angle of the drive belt wheel. The cleaning area could be a part of the windscreen or the entire windscreen. A size of the cleaning area depends on a size of the wiper blade, and, more particularly the length of the cleaning area depends on a range of the rectilinear motion of the wiping blade. The range of the rectilinear motion of the wiper blade, which is carried by the guidance block, depends on the rotation angle of the drive belt wheel. The diameter of the drive belt wheel influences the length of the cleaning area too. Bigger is the drive belt wheel, longer is the length of the cleaning area. The length of the cleaning area can be calculated thanks to the following calculation:

$$l = \frac{d \times \pi}{360 \div ra}$$

l being the length of the cleaning area, d being the diameter of the drive belt wheel, ra being the rotation angle of the drive belt wheel.

BRIEF DESCRIPTION OF THE DRAWINGS

Other features, details and advantages of the invention can be inferred from the specification of the invention given hereunder. Various embodiments are represented in the figures wherein.

DETAILED DESCRIPTION OF THE INVENTION

The orthogonal system LVT represents the orientation of the wiping device. The vertical axis V and the transversal axis T correspond to axis which define a plan of a cleaning area of the detection system, and the longitudinal axis L corresponds to a perpendicular axis of the vertical axis V and the transversal axis T.

Figure 1:
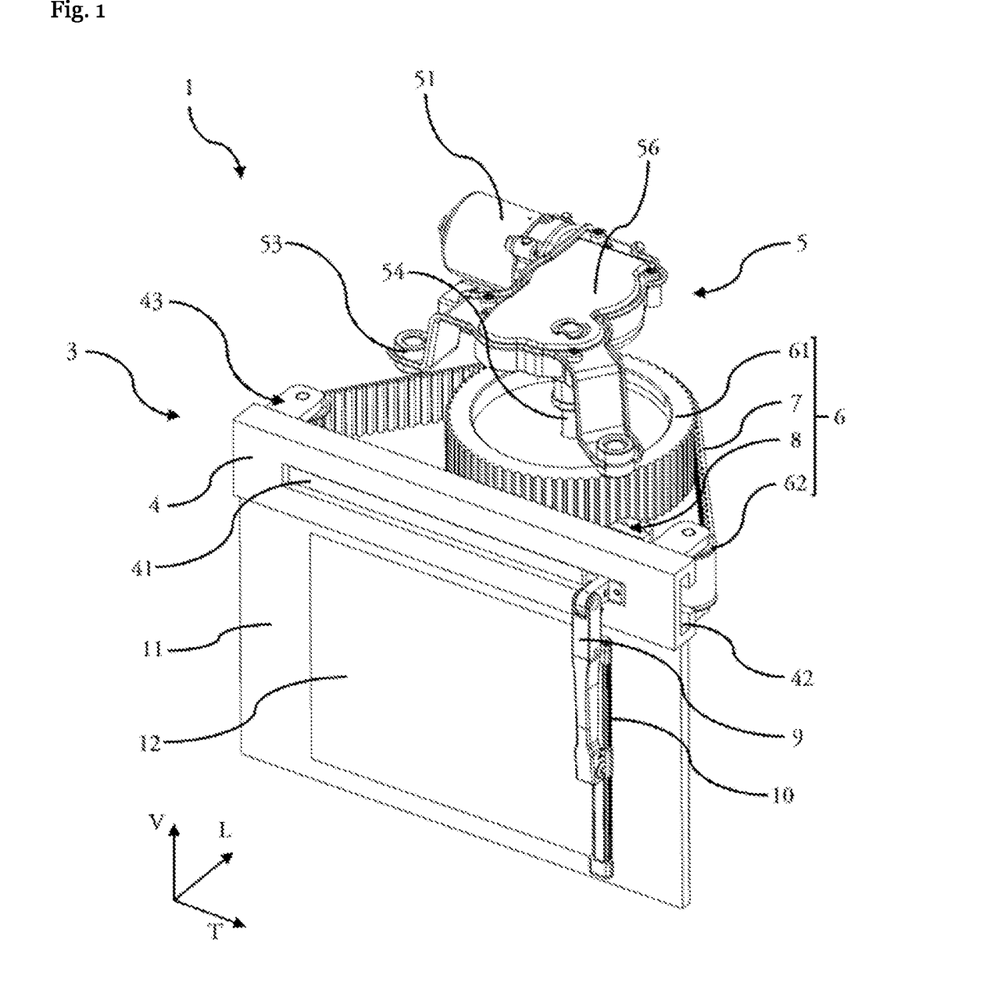
FIG. 1 shows a general overview of a detection system according to the invention.

FIG. 1 shows an overview of a detection system 1. The detection system 1 comprises a wiping device 3 which has the function to wipe a windscreen 11 of the detection system 1, more particularly a cleaning area 12 of the windscreen 11. The cleaning area 12 can cover only a part of the windscreen 11, as illustrated in the FIG. 1, or can cover entirely the windscreen 11. The windscreen 11 is placed in front of a sensor which couldn't be seen in the FIG. 1.

The wiping device 3 comprises a guidance frame 4. The guidance frame 4 delimits an opening 41 which mainly extends according to a plan defined by a vertical axis V and a transversal axis T, such plan being parallel to the cleaning area 12. A guidance block 8 emerges partially from the opening 41 and carries a wiper arm 9 which carries a wiper blade 10. The wiper arm 9 and the wiper blade 10 are mainly extended according to the vertical axis V, in order to the wiper blade 10 is in contact with the cleaning area 12 of the windscreen 11. The main size of the wiper blade 10 is parallel to the vertical axis V and is equal or above to a vertical size according to the vertical axis V of the cleaning area 12, in order to clean entirely the cleaning area 12 when the wiping device 3 is in operation.

As describe later, the guidance block 8 is set in a rectilinear motion, parallel to the transversal axis T, from a vertical end of the opening 41 to the other. The guidance block 8 carries the wiper arm 9 and the wiper blade 10, which are set in a rectilinear motion too. So that the wiper blade 10 makes a back and forth movement against the cleaning area 12 to clean it. The opening 41 has a transversal size according to the transversal axis T longer than a transversal size of the cleaning area 12 in order that the wiper blade 10 can cover the totality of the cleaning area 12 when the wiping device 3 is in operation.

The wiping device 3 comprises a motor unit 5 which sets the guidance block 8 in a rectilinear motion all along the opening 46 thanks to a drive unit 6. The drive unit 6 comprises the guidance block 8, a belt 7, a drive belt wheel 61 and at least one driven belt wheel 62. The drive unit 6 is positioned between the motor unit 5 and the wiper arm 9, and is able to set the wiper arm 9 and the wiper blade 10 in a rectilinear motion from a rotational motion initiated by the motor unit 5.

The motor unit 5 comprises a motor 51 which initiates a rotational motion and transmitted it to a gearbox comprised in an internal volume of a housing 56. The motor 51 comprises a motor shaft, which is included in the internal volume of the housing 56 too. The content of the internal volume of the housing 56 will be describing in details thereafter. A gearbox shaft 54 emerges from the housing 56 and is extended until the drive belt wheel 61. The gearbox shaft 54 is set in motion by the gearbox, and sets the drive belt wheel 61 in motion. The motor unit 5 comprises fixation means 53 in order to fix the motor unit 5 to any external elements of the wiping device 3.

The wiping device 3 as shown in FIG. 1 comprises two driven belt wheels 62, which are disposed at each end of the guidance frame 4 and are attached to a belt wheel support 43. The details concerning the link between the driven belt wheels 62 and the belt wheel support 43 will be described thereafter. The drive belt wheel 61 and the two driven belt wheels 62 are organized in order that each center of each belt wheel forms an isosceles triangle. The belt 7 is arranged around each belt wheel. The belt wheels are toothed belt wheels and the belt 7 is a toothed belt. Teeth of the belt wheels and teeth of the belt 7 are configured to interact each other. Thus, when the drive belt wheel 61 is set in motion by the motor unit 5, the belt 7 and the driven belt wheels 62 are set in motion too.

The guidance block 8 is arranged in a guidance slot 42 which locks the guidance block 8 in order that the latter is able to move according to a direction parallel to a transversal axis T only. The guidance block 8 is attached to a portion of the belt 7 which is rectilinear and between each driven belt wheel 62. Thus, when the belt 7 is set in motion by the drive belt wheel 61, the guidance block 8 is set in a rectilinear motion by the belt 7. The guidance block 8 allows the wiper arm 9 and the wiper blade 10 to be set in a rectilinear motion through the opening 41. That's how the wiper blade 10 can wipe the cleaning area 12 thanks to its back and forth movement.

For example, the wiping device 3 can also include a device for spraying cleaning liquid (not illustrated in FIG. 1) onto the cleaning area 12 of the windscreen 11 so as to improve the cleaning performance. At least a part of said device for spaying cleaning liquid can be mounted on or in the wiper arm 9.

Figure 2:
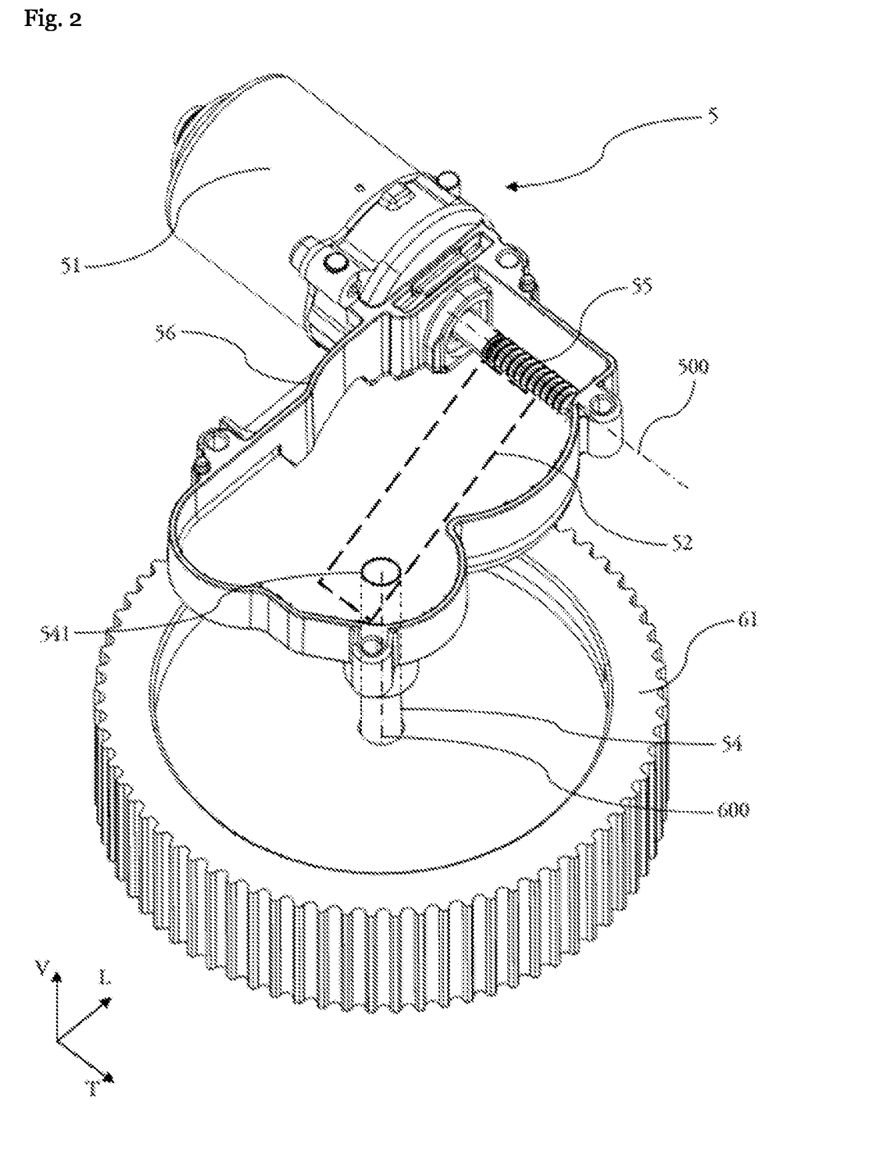
FIG. 2 shows a view of a motor unit which is able a unidirectional rotational motion into a reversible rotational motion.

FIG. 2 shows the motor unit 5 and the internal volume of the housing 56. The motor 51 is extended into the housing 56 with the motor shaft 55. The motor shaft 55 is mainly extended according to a motor axis of rotation 500, which is parallel to the transversal axis T. The motor shaft 55 can be a worm screw which turns according around the motor axis of rotation 500 to a unidirectional rotational motion.

The gearbox 52 is schematically represented in the housing 56, and is in contact with the motor shaft 55. The gearbox 52 can comprise a toothed wheel which is adapted to interlock with the motor shaft 55. The motion which comes from the motor shaft 55 is transmitted along the gearbox 52 until the gearbox shaft 54. The gearbox shaft 54 links the gearbox 52 to the drive belt wheel 61. The gearbox shaft 54 crosses a center of the drive belt wheel 61 and rotates around a drive belt wheel axis of rotation 600, parallel to the vertical axis V.

The gearbox 52 is able to convert the unidirectional motion of the motor shaft 55 into a reversible rotational motion. Thus, the gearbox shaft 54 is set in motion according to a reversible rotational motion and sets the drive belt wheel 61 in a same motion. The drive belt wheel 61 rotates between a clockwise motion and a counterclockwise motion. The motor axis of rotation 500 and the drive belt wheel axis of rotation 600 are perpendicular between them.

Figure 3:
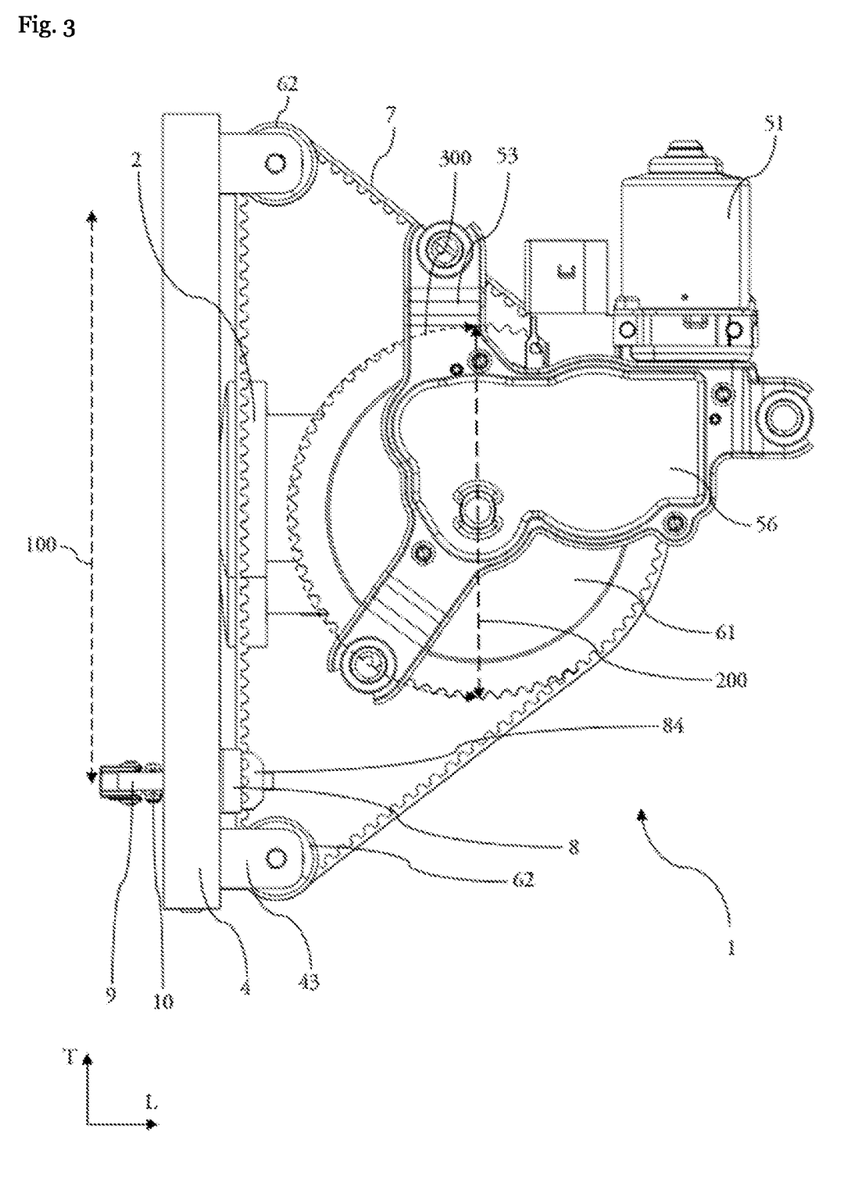
FIG. 3 shows a top view of the detection system.

FIG. 3 shows a top view of the detection system 1, according to a point of view parallel to the vertical axis. FIG. 3 allows to observe the sensor 2, which is under the drive unit and behind the windscreen. The wiping device cleans the cleaning area in order to assure a clear view for the sensor 2.

The cleaning area is extended at least according to the transversal axis T, which is represented by a length 100. The length 100 can also correspond to the extension of the rectilinear motion of the wiper arm 9 and the wiper blade 10. Such length 100 depends on a diameter 200 of the drive belt wheel 61, and a rotation angle 300 of the drive belt wheel. The rotation angle 300 is the angle which corresponds to a circular arc that a point located on the periphery of the drive belt wheel 61 make during a unidirectional sequence of the reversible rotational motion of the drive belt wheel 61. Thus, the length can be found by the following calculation:

$$l = \frac{d \times \pi}{360 \div ra}$$

with l being the length 100 of the cleaning area, d being the diameter 200 of the drive belt wheel 61 and ra being the rotation angle 300 of the drive belt wheel 61. Thus, the wiping device can be adapted according to the length 100 of the cleaning area. It's possible to modify the diameter 200 of the drive belt wheel 61. Bigger is the diameter 200 of the drive belt wheel 61, longer is the length 100 of the cleaning area. In the same vein, bigger is the rotation angle 300 of the drive belt wheel 61, longer is the length 100 of the cleaning area. The rotation angle 300 can be changed by modifying the gearbox of the motor unit 5. Of course, if any modification among those above has been done, it could involve other modifications, like a readjustment of the size of the guidance frame 4 and its opening for example.

Figure 4:
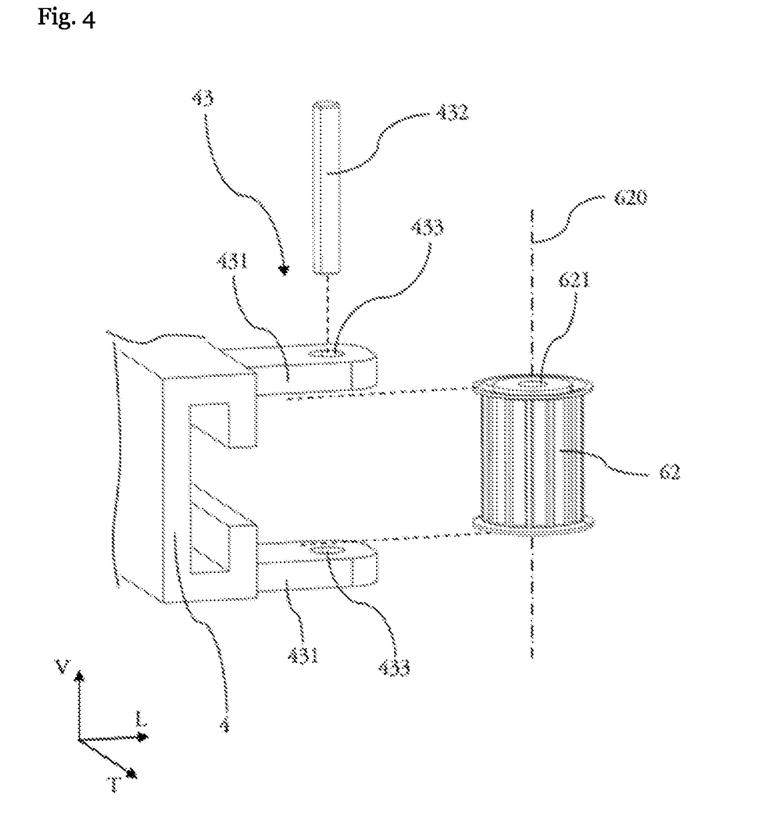
FIG. 4 is an exploded view of a link between a driven belt wheel and a belt wheel support.

FIG. 4 is an exploded view which show the belt wheel support 43 and how the driven belt wheel 62 is attached on. The belt wheel support 43 comprises two strips 431 which emerge from the guidance frame 4 and are mainly extended according to a direction parallel to a longitudinal axis L. The strips 431 can be molded with the entire guidance frame 4 for example. Each strip 431 comprises a strip hole 433 which crosses the strip 431. The strip holes 433 of the strips 431 are facing each other. The two strips 431 are separated by a distance which allow the implementation of the driven belt wheel 62 between the two strips 431. The driven belt wheel 62 comprises a drilling 621 which crosses entirely the driven belt wheel 62 and is formed around a driven belt wheel axis 620, which is a rotational axis of the driven belt wheel 62. When the driven belt wheel 62 is implemented between the two strips 431, the drilling 621 faces each strip hole 433.

The driven belt wheel 62 is attached to the belt wheel support 43 thanks to a rod 432 which crosses the drilling 621 and the two strip holes 433. Thereafter, the rod 432 can be glued to each strip hole 433. In such situation, the driven belt wheel 62 is able to freely turn around the rod 432, and any other movements are blocked by the rod 432 and the strips 431.

Figure 5:
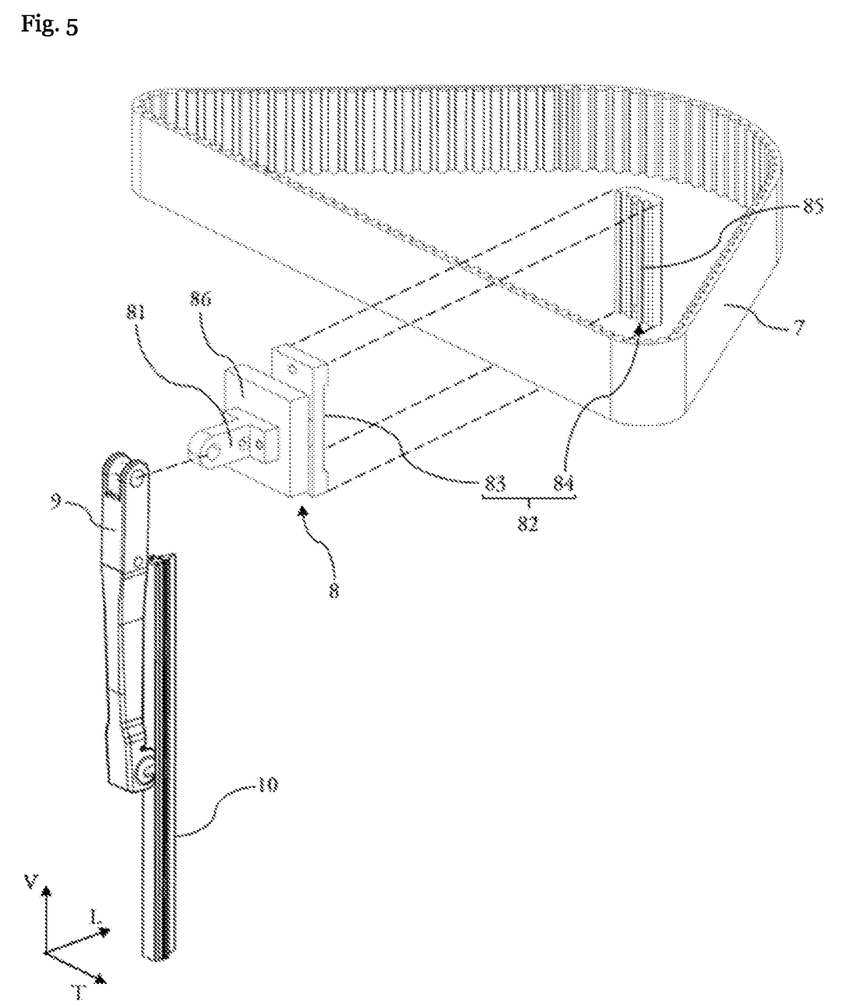
FIG. 5 is an exploded view of a link between a guidance block and a belt.

FIG. 5 is an exploded view which show the attachment of the belt 7 and the wiper arm 9 on the guidance block 8. The guidance block 8 comprises a first attachment 81 which links the guidance block 8 to the wiper arm 9, and a second attachment 82 which links the guidance block 8 to the belt 7. The first attachment 81 is the part of the guidance block 8 which emerges from the opening of the guidance frame, in order to maintain the wiper arm 9. The first attachment 81 can link the wiper arm 9 thanks to any mechanical attachment which doesn't interfere with the guidance frame, by screwing for example.

The second attachment 82 is at the opposite of the first attachment and comprises a cavity 83 and a fixing cover 84. The cavity 83 is oriented at the opposite of the first attachment 81. The cavity 83 is configured in terms of size to receive the belt 7. When the belt 7 is inserted in the cavity 83, the fixing cover 84 encloses the cavity 83 by contact in order to lock the belt 7 inside the cavity 83. Thereafter, the fixing cover 84 can be attached by screwing for example. The fixing cover 84 comprises complementary forms 85 which are oriented on a face of the fixing cover which is in contact with the belt 7. Complementary forms 85 allows the interlocking between the fixing cover 84 and the belt 7. Thus, when the belt 7 is set in motion by the drive belt wheel, the guidance block 8 follows the same motion as the belt 7 thanks to the interlocking between the second attachment 82 of the guidance block 8 and the belt 7.

The guidance block 8 comprises a guidance square 86 between the first attachment 81 and the second attachment 82 and will be describing in details below.

Figure 6:
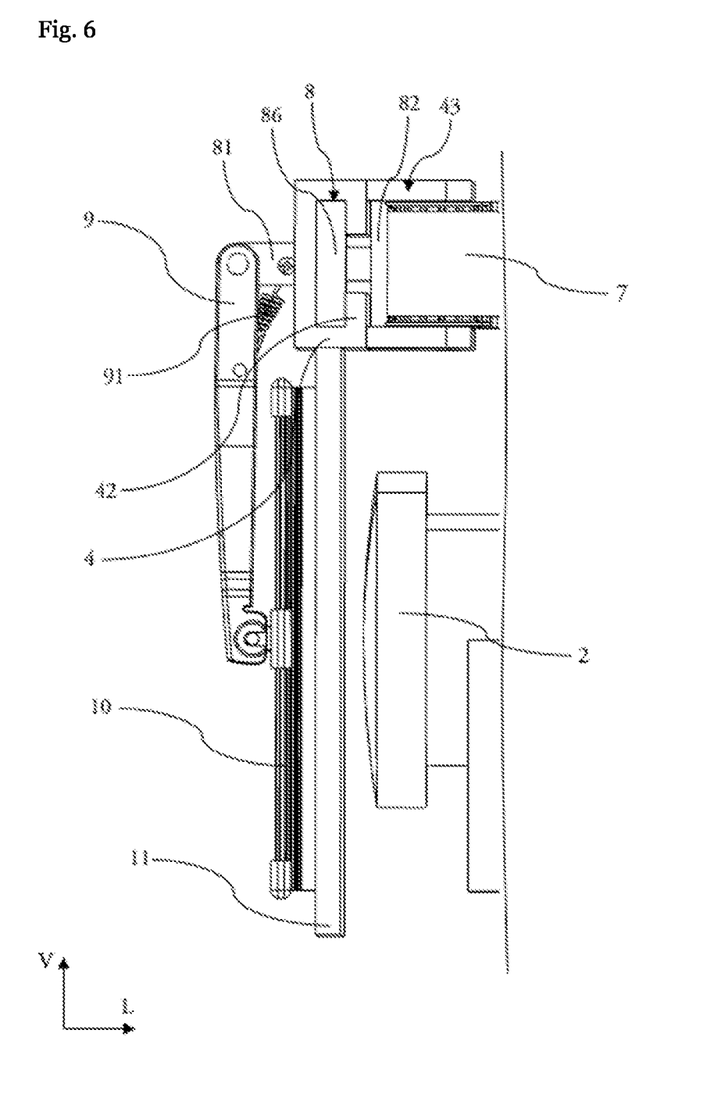
FIG. 6 is a side view of a guidance frame of a wiping device according to the invention.

FIG. 6 is a side view of the guidance block 8 inserted in the guidance frame 4. The side view is parallel to the transversal axis.

In order to maintain the rectilinear motion of the guidance block 8, the guidance square 86 is inserted into the guidance frame 4, more particularly into the guidance slot 42. The guidance slot 42 is a form partially open, molded in the guidance frame 4 which enclose the guidance square 86 in order to maintain the rectilinear motion of the guidance block 8 when its sets in motion by the belt 7. The guidance slot 42 blocks any other movement of the guidance block 8, which could occur following of some shakings of the vehicle for example. The guidance block 8 is maintained in its rectilinear motion and carries the wiper arm 9 and the wiper blade 10, the latter assuring its operation of wiping of the cleaning area. In order to insert the guidance block 8 into the guidance slot 42, the latter can comprise a removable cap in an endpoint. The cap is removed to insert the guidance block 8 in a sliding manner into the guidance slot 42, and is repositioned to close the guidance slot 42. The guidance slot 42 is partially open in order to assure the link with the belt 7 thanks to the second attachment 82, but keeping to maintain the guidance square 86. The first attachment 81 of the guidance block 8 can cross the guidance frame 4 thanks to the opening.

Concerning the wiper arm 9, it can comprise a spring 91 which is a secondary link between the first attachment 81 of the guidance block 8 and the wiper arm 9. The spring 91 has the function to apply correctly the wiper blade 10 against the cleaning area, in order to wipe it properly.

It will be understood from the foregoing that the present invention provides a wiping device with a drive unit which allows to set a wiper blade in a reversible rectilinear motion against a cleaning area, the reversible rectilinear motion starting from a unidirectional rotational motion initiated by a motor.

However, the invention cannot be limited to the means and configurations described and illustrated herein, and it also extends to any equivalent means or configurations and to any technically operative combination of such means.

What is claimed is:

1. A wiping device for a detection system of a vehicle, comprising a wiper blade, a wiper arm, a motor unit and a drive unit, the drive unit including a guidance block which carries the wiper arm, and which is inserted in and extending through opposite sides of a C-shaped guidance frame, the drive unit further including a plurality of belt wheels, at least one drive belt wheel is driven in a rotational motion by the motor unit, wherein the drive unit includes a belt which is driven by the belt wheels and moves the guidance block according to a rectilinear motion.

2. The wiping device according to claim 1, further comprising two driven belt wheels which are arranged on each endpoint of the guidance frame.

3. The wiping device according to claim 2, wherein at least one driven belt wheel is carried by a belt wheel support arranged on the guidance frame.

4. The wiping device according to claim 2, wherein the belt is a toothed belt, the drive belt wheel and the driven belt wheels being toothed belt wheels to interact with the belt.

5. The wiping device according to claim 1, wherein the guidance frame includes a guidance slot where the guidance block is inserted in a sliding manner.

6. The wiping device according to claim 1, wherein the guidance block comprises a first attachment for the wiper arm, and a second attachment for the belt.

7. The wiping device according to claim 6, wherein the first attachment of the guidance block is passing through an opening of the guidance frame.

8. The wiping device according to claim 6, wherein the second attachment comprises a cavity where the belt is inserted in, and a fixing cover that comprises complementary forms with the belt.

9. The wiping device according to claim 1, wherein the motor unit includes a motor and a gearbox, the motor comprising a motor shaft which moves according to a unidirectional rotational motion, the gearbox being driven by the motor shaft and driving the drive belt wheel according to a reversible rotational motion.

10. The wiping device according to claim 9, wherein a motor axis of rotation is perpendicular to a drive belt wheel axis of rotation.

11. A detection system for a vehicle, comprising a sensor and a wiping device, the wiping device including a wiper blade, a wiper arm, a motor unit and a drive unit, the drive unit including a guidance block which carries the wiper arm, and which is inserted in and extending through opposite sides of a C-shaped guidance frame, the drive unit further including a plurality of belt wheels, at least one drive belt wheel is driven in a rotational motion by the motor unit, wherein the drive unit includes a belt which is driven by the belt wheels and moves the guidance block according to a rectilinear motion.

12. The detection system according to claim 11, further comprising a windscreen configured to be placed in front of the sensor of the detection system.

13. The detection system according to claim 12, wherein the windscreen includes a cleaning area which is wiped by the wiper blade, a length of the cleaning area depends on a diameter of the drive belt wheel and a rotation angle of the drive belt wheel.

\* \* \* \* \*